Jan. 13, 1959 W. V. PATTERSON 2,868,889

ELECTROMAGNETIC HEAD STRUCTURE

Filed Feb. 24, 1953 3 Sheets-Sheet 1

INVENTOR.
Wesley V. Patterson
BY
Mann, Brown and Hansmann
Attys.

ELECTROMAGNETIC HEAD STRUCTURE

Filed Feb. 24, 1953 3 Sheets-Sheet 2

INVENTOR.
Wesley V. Patterson
BY
Mann, Brown and Hansmann
Attys.

Jan. 13, 1959 W. V. PATTERSON 2,868,889

ELECTROMAGNETIC HEAD STRUCTURE

Filed Feb. 24, 1953 3 Sheets-Sheet 3

INVENTOR.
Wesley V. Patterson
BY
Mann, Brown and Hansmann
Attys.

United States Patent Office 2,868,889
Patented Jan. 13, 1959

2,868,889

ELECTROMAGNETIC HEAD STRUCTURE

Wesley V. Patterson, Chicago, Ill., assignor to John J. Kelly, Minneapolis, Minn., as trustee Application February 24, 1953, Serial No. 338,524

6 Claims. (Cl. 179—100.2)

My invention relates to magnetic heads and method of producing magnetic heads. More particularly the invention is concerned with recording, erase and playback heads used with tape recorders.

The magnetic tape recorder, though reasonably recently perfected, has been established as one of the most practical recording systems. However, the quality of the reproduced sound in the ordinary tape recorder is far below the capabilities of the amplifier, magnetic tape, speaker and microphone. This lack of quality may be traced to the magnetic heads.

Consequently, certain objects of my invention are to provide magnetic heads and method for producing magnetic heads: having a very high signal to noise ratio with respect to external fields; having a frequency response from 20 C. P. S. to 15 kc. at a tape speed of 7.5 inches per second; having an essentially flat frequency response from 40 C. P. S. to 10 kc. after equalization with not over 20 db of equalization; which introduces no appreciable distortion to the signal throughout the audio range and particularly at the low frequencies; having a greatly improved low end response with no adverse effect on signals above 3000 C. P. S.; wherein the impedance of the head is not appreciably affected by the gap width; wherein the high end response can be variably limited to provide a virtual cut-off by altering the gap width without necessitating a change in the equalization or materially altering the response in the lower ranges; having a broad resonance characteristic so that the apparent resonant frequency may be varied to coincide with the bias frequency by altering the type of winding to change the distributed capacity of the coil; and capable of many more hours of operation before high frequency response begins to fall off due to opening of the gap.

Another object of my invention is to provide magnetic heads and method for producing magnetic heads, which are physically small to (1) reduce hum field pickup to a minimum, (2) make it practical to place a plurality of heads, for example, record, playback, erase and monitoring heads, in the space formerly occupied by one head, (3) reduce the cost of production, and (4) conserve high permeability and high priority materials.

Another object is to provide a novel magnetic head unit comprising a coil and core assembly and a shield which is simple in construction, not affected by vibration and impervious to moisture.

A further object of my invention is to provide a magnetic head unit and mounting mechanism which enables the core gap to be properly oriented with respect to the magnetic tape.

Another object is to provide magnetic heads and method for producing magnetic heads which are uniform in their electrical and physical characteristics so that a standard equalization may be used and the heads may be interchanged.

Still further objects are to provide magnetic heads for magnetic sound on film systems and provide magnetic heads which may be used in conjunction with a photoelectric sound system and thereby provide magnetic sound as well as photoelectric sound on film.

These and other objects and advantages will become more readily apparent as the following description proceeds and is read in conjunction with the attached drawings, in which.

Figure 1:
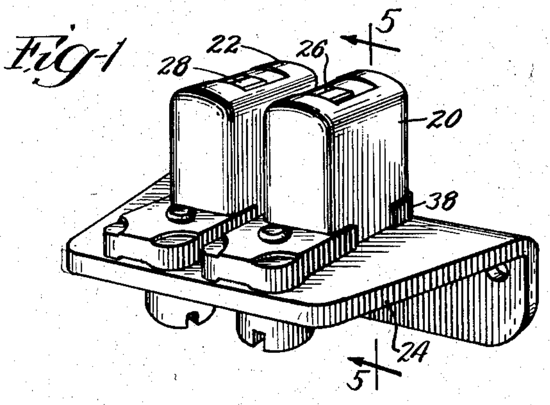
Figure 1 shows a pair of magnetic head units arranged on a mounting bracket and ready for association with a tape recorder.

As seen in Figure 1, a pair of magnetic head units 20 and 22 is carried by a mounting bracket 24 and arranged in side-by-side relationship so that a magnetic tape may traverse both units. The core gaps for providing the tape magnetizing flux are shown at 26 and 28.

Figure 5:
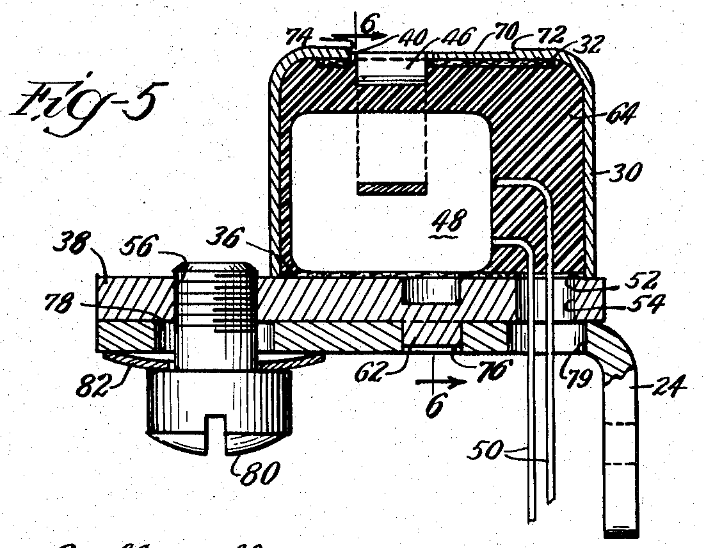
Figure 5 is a sectional view taken on line 5—5 of Figure 1.
Figure 6:
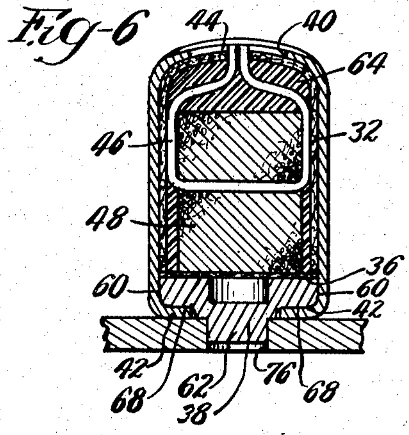
Figure 6 is a sectional view taken on line 6—6 of Figure 5.

As best seen in Figures 2, 3, 5 and 6, each magnetic head unit comprises a shield 30, a separator 32, a coil and core assembly 34, a bottom shield plate 36 and a mounting member or plate 38. Shield 30 has an opening 40 in its upper face and depending wings 42 integral therewith. The separator 32, which is of an insulating material such as fish paper, is shaped substantially like shield 30 and provided with an opening 44 (Figure 6). In assembled position, opening 44 is aligned with opening 40. The assembly 34 consists of a core 46 and coil 48 having terminal leads 50. Bottom shield 36 is shaped to fit within the lower open end of shield 30 and has an aperture 52 through which leads 50 may pass. Mounting plate 38 is provided with an aperture 54 through which the leads may pass, a threaded bore 56, and grooves 60 formed in each side edge. A nipple or cylinder 62 depends from the lower face of plate 38.

In assembling, the head unit separator 32 is placed over assembly 34 until the gap 26 protrudes through aperture 44. The separator and core and coil are moved into shield 30 through the open bottom until the upper ends of core 46 protrude slightly through opening 40. The gap 26 is substantially aligned with the longitudinal axis of the shield. With the parts so held, a plastic compound 64 is introduced within the shield to fill it to within a short distance of the lower edge 66. For example, Permafill thermo-setting plastic produced by the General Electric Company may be used. Upon "setting," the plastic will bond the coil, core, separator, and shield together and make the unit impervious to moisture and capable of withstanding appreciable shocks.

Either before or after plastic 64 has "set," leads 50 of coil 48 are passed through aperture 52 of shield plate 36 and the shield plate placed within the confines of shield 30. Leads 50 are then placed through aperture 54 of mounting plate 38 and the mounting plate moved against the lower edge 66 of shield 30 with the depending wings 42 disposed within grooves 60. The lower face of plate 38 is cut away as indicated at 68 so that wings 42 may be crimped under plate 38 to securely hold the plate and shield together.

It will be noted that the coil and core assembly is shielded on all sides and this appreciably reduces stray field pickup. In the case of record and playback heads the coils and cores must be electromagnetically as well as electrostatically shielded, hence in these heads the shield 30 and shield 36 are of a high permeability material such as Mu Metal. In the case of erase heads, electromagnetic shielding is not of the first moment and if desired, shields 30 and 36 could be of a non-magnetic material.

As will be hereinafter pointed out, the core and coil assembly 34 need only be of a very small size to enable quality recordings. This alone and also in conjunction with the magnetic head unit arrangement enables one of the important objects of this invention to be realized. It is believed that the stray field or hum field pickup in a magnetic head varies in a non-linear manner with respect to the area of the head being cut. Or in other words, reducing the size of a magnetic head by one-half will reduce the hum or stray field pickup by appreciably more than one-half. While it is not contended that this theory is the only explanation or the correct one, magnetic head units constructed in accordance with the teachings herein have an extremely high signal to noise ratio.

The separator 32 is positioned between core 46 and shield 30. This prevents a magnetic short between these members and also enables the coil and core assembly to be wedged within shield 30 and held therein for "potting" in plastic.

After the core is secured within the shield 30, the upper ends of the core protruding through opening 40 and the upper face of the shield may be ground or lapped away to produce a groove 70 across the unit. The groove is approximately the width of the tape, has side walls 72 and 74, and is ground on a circular curve. The curve ordinarily has a substantial radius to insure intimate contact between the upper ends of core 46 and the magnetic tape.

As seen in Figures 5 and 6, bracket 24 is provided with a circular aperture 76 and openings 78 and 79. Nipple 62 of plate 38 fits within aperture 76. A machine screw 80 is disposed within opening 78 and threaded into bore 56 of plate 38. A washer 82 is arranged between the head of screw 80 and bracket 24.

Figure 2:
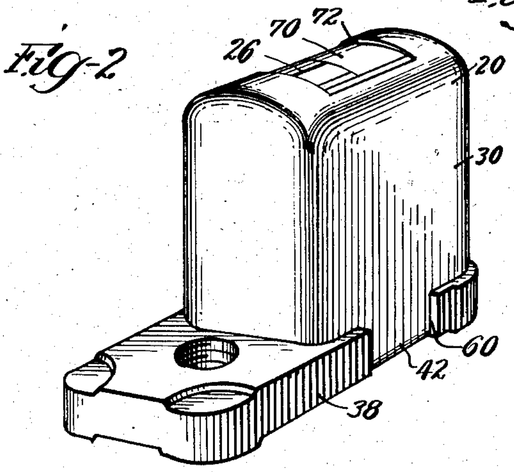
Figure 2 is an enlarged view of a single magnetic head unit shown in Figure 1.
Figure 3:
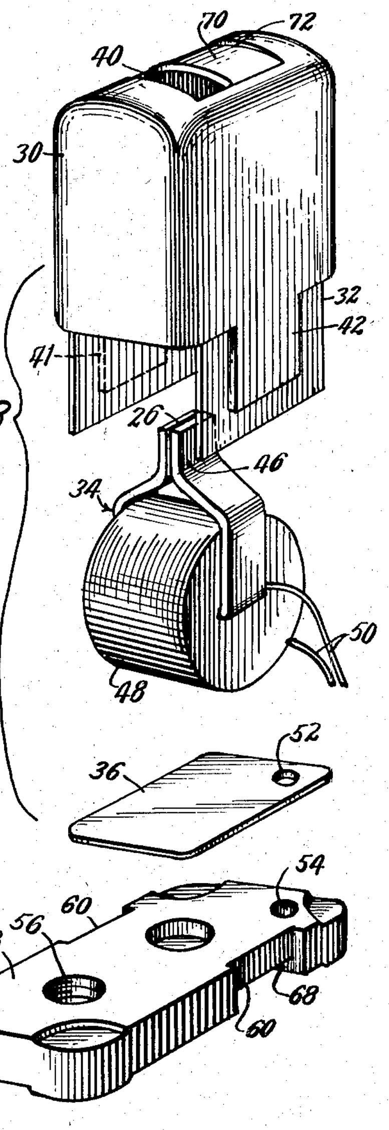
Figure 3 is an exploded view of the magnetic head unit shown in Figure 2.

In order for record and playback heads to be interchangeable, not only must the core gaps of the heads be substantially identical but the core gaps must be capable of association with the tape in substantially the same position. In my magnetic heads the core gaps are straight, as seen in Figures 1, 2, and 3. Hence, in order to record sound on one head and play back the recording on another head, the recording and playback heads must have their core gaps disposed adjacent identical portions of the tape when the tape is moved across the head. If this were not so, the playback head could not faithfully reproduce the recorded sound. Furthermore, the straight line core gaps must both be disposed at the same angle relative to the direction of movement of the tape.

My magnetic head unit and mounting bracket fix the position of the core gap with respect to the width of the tape and yet permit the core gap to be angularly adjusted. When nipple 62 is placed within aperture 76 of mounting bracket 24, the head unit cannot move translatably relative to the bracket but may be rotated relative thereto. Opening 78 is larger than screw 80 so that an angular or azimuth adjustment of several degrees may be made. After the core gap is properly oriented, screw 80 may be tightened to maintain the positioning.

It is believed that many of the electrical features of my magnetic heads result at least in part from the very small and compact physical structure. As previously mentioned, the signal to noise ratio is improved. Uniform frequency response over a relatively broad band, improved low end response, fine fidelity, freedom of effect on the impedance curve by changing the gap width, and sharp high end cut-off without effecting the low or middle response are believed attributal at least in part to the small size of the magnetic head units.

By way of illustration, the magnetic head units shown in Figures 1, 2, 3, 5, and 6 may have a height of approximately .4 inch, a width of .28 inch, and a length of .53 inch. The coil and core assembly is, of course, even smaller having dimensions, for example, of .375, .225 and .3 inch representing the height, width and length, respectively. The dimensions should not be understood as limiting my contribution to the art since many of the features and methods of construction are applicable to larger magnetic heads. Furthermore, the physical size may be reduced even further since in the main the coil controls the physical size and the above dimensions are given for head units having relatively large coils.

The mechanical advantages of a small magnetic head unit are appreciable. Many head units may be mounted in the space formerly occupied by an erase and record-playback head. For instance, it has been found desirable for high fidelity tape recording to provide separate playback and record heads. Hence, three of my units, namely, erase, recording, and playback heads, may be placed on recorders in the space formerly occupied by the erase and combined record-playback head to improve the fidelity of the recorder. Many other advantages result from the small size of the heads either in converting existing recorders or building new recorders.

Having described the magnetic head units and mounting mechanism, particular attention will be given to the core and coil assembly. The electrical characteristics of the magnetic head unit are governed to a large extent by this assembly and these characteristics are not only influenced by the physical form but also by the method of producing the assembly.

Figure 7:
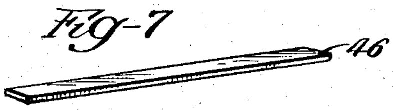
Figures 7 through 13 show the various stages in producing the magnetic head shown in Figure 3.

The core 46 of the coil and core assembly 34, shown in Figures 3, 5, 6 and 14, is formed of a high permeability material such as Mu Metal. As seen in Figure 7, the cores are elongated bars which may be stamped from sheets. As will be hereinafter pointed out at least one side of the core must be as flat and smooth as possible. In order to remove all burrs or irregular edges produced in blanking the cores, the top and/or bottom faces may be ground or the cores may be agitated in a slurry.

Figure 8:
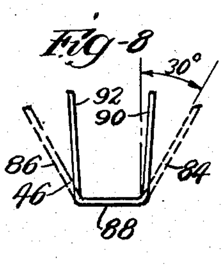

The cores are then bent into the shape shown in Figure 8 (solid lines) by means of suitable dies. It will be noted that legs or leg portions 84 and 86 of the core are disposed at an angle between 90 and 100 degrees relative to the body portion 88 of the core. This disposition of the legs facilitates the winding of a coil on body portion 88, since the legs may be held in a suitable die, which will not interfere with the wire being wound upon the core.

The internal faces 90 and 92 of legs 84 and 86 may now be rough lapped, i. e. smoothed by rubbing against a smooth surface having a relatively coarse lapping compound thereon. This serves to further flatten internal faces 90 and 92.

The cores are annealed in a hydrogen atmosphere at a relatively high temperature for several hours. This materially increases the permeability of the core.

Internal faces 90 and 92 are given a finish lap by using a very fine lapping compound or a hone. It is preferable to have these faces flat to within one-half a wave length of light.

Legs 84 and 86 of the core may at this time be electroplated with a non-magnetic material. However, as hereinafter discussed, the electroplating may be performed further along in the process and will be considered hereinafter.

Since in most applications it is desirable to insulate the core from the coil, an insulating material must be disposed between the core and coil. This may best be accomplished by coating body portion 88 with a thin coat of insulating enamel.

A coil 94, which in the case of record and playback heads may be #46 Formex wire produced by General Electric Co., is wound upon body portion 88. Preferably, this is accomplished by winding the wire directly on the core, and, during the winding operation, or immediately thereafter, stabilizing the turns in space by the application of a suitable bonding agent, such as Permafill. During the winding operation, demountable side dies are used for supporting the core ends and limiting the lateral width of the coil as it is being wound. The number of turns will vary depending upon the input requirements of various recorders but up to 4500 may be provided on the core and still maintain the physical size within the dimensions set forth above in regard to Figures 1, 2, 3, 5 and 6. In the case of erase heads or low impedance heads, much larger wire may be used and only a relatively few turns are needed.

The insulating material on body portion 88 as well as the insulation on the wire serves to insulate the coil and core. Where it is desirable to have the core and inner turns of the coil electrically connected, the insulation material is not applied to the core. The first layer of turns that is wrapped around the core will have the Formex insulation broken down at the edges of the core. Subsequent layers will, of course, be insulated from each other and will not have the insulation broken down since the straight edges of the core will be covered by the first layer or two.

Figure 9:
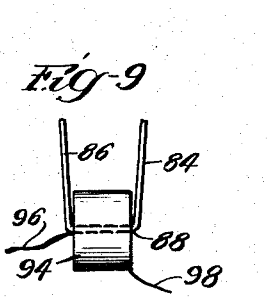

A plastic compound such as Permafill is used to impregnate the coil, and the plastic is "set" to provide a rugged coil. A pigtail lead 96 extends from the inner turns and a lead 98 extends from the outer turns. Figure 9 shows a coil wound upon the core.

Since leads 96 and 98 may be as small or even smaller than #46 wire, no appreciable strain can be exerted on them. Lead breakage may be avoided by soldering the leads to larger and stronger terminal wires and bonding all leads and wires as securely as possible to the coil and core assembly. With the core shaped as shown in Figure 9, the terminal wires are soldered to the ends of leads 96 and 98 and the joined ends of the leads and wires are laid against the outer surface of coil 94. A piece of tape is wrapped around the coil to hold the joined ends to the coil. Each terminal wire extends beyond an edge of the tape and is folded back upon itself to extend across the tape and beyond the other edge. Another wrap of tape will secure the folded back portions of the terminal wires to the core. Thus it will be seen that any pull exerted on the terminal wires will be received by the tape and coil and not by the fragile leads 96 or 98.

Figure 10:
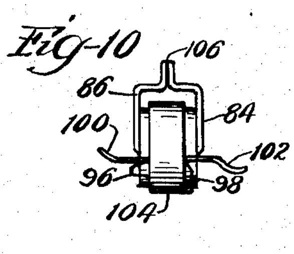

Such a termination is shown on the coil of Figure 10 and the terminal wires are indicated by reference characters 100 and 102. Wires 100 and 102 are connected to leads 96 and 98, respectively, and the outer layer of tape is indicated by numeral 104.

As seen in Figure 10, the legs 84 and 86 are bent until their free ends are in close proximity to provide a core gap 106. In order for the gap to be effective, the ends of the legs must be separated by a non-magnetic material. The width of gap 106 will control the upper frequency limit of the head. If a given gap is narrowed, higher frequencies may be recorded and if widened, a lower frequency limit will prevail. In my heads, this high frequency cut-off is relatively sharp so the high end response may be controlled by varying the gap width. The size of the gap appears to have no appreciable effect on the impedance of my heads, therefore no change in the equalization of the amplifier is necessary when substituting heads having different cut-off frequencies.

Usually a fixed gap width will be desired and this width must not be appreciably larger than the fixed value or else the high frequency response will not be sufficient. In order to permit minute spacing apart of the legs 84 and 86, they are electroplated with copper or some other non-magnetic material. Each face, 90 and 92, is plated with metal to a thickness of one-half the gap width. When the legs are brought together to form the gap, the legs will be spaced the correct gap width. Since the legs have been ground, lapped or honed to a flat condition, the electroplated material will follow the contours of the leg and aslo present a flat face. The thickness of the deposited material may be readily controlled by changing the plating current or time of plating, and hence, the width of the gap can be readily controlled.

It should be appreciated that the cores can be electroplated at any time after faces 90 and 92 are finish lapped. If desired, the entire core may be electroplated.

The free end portions of core 46 must be in firm contact over faces 90 and 92 to ensure a uniform gap. The core may be bent into this position by means of a die and the end portions held in firm contact by slightly overbending legs 84 and 86 or any suitable securing means such as wire wrapped around the end portions.

It will be noted that the coil is wrapped directly on the core 46. This provides a very close coupling and is believed to contribute appreciably to the ability of my heads to reproduce signals with very high fidelity. Furthermore, the close coupling enables the head to produce sufficient signal voltages and produce sufficient field strength at the gap even though the core and coil are physically small.

It has been found that the permeability of the core is appreciably reduced if sharp bends are made therein after annealing. Sharp bends made in the core before annealing will also reduce the permeability; however, the loss will be regained upon annealing. Any loss of permeability reduces the output ability of the head either at the core gap or at the terminal leads depending upon whether the head is "recording" or "playing back," respectively.

As best seen in Figure 10, the only sharp or 90-degree bends made in the core occur at points between the leg portions 84 and 86 and body portion 88. These bends are made before annealing and therefore do not affect the permeability of the core. The other bends are not sharp bends and do not unduly lower the permeability.

A further feature enabling high output is that the core 46 is homogeneous. The reluctance of the homogeneous core will be negligible and therefore the flux will be very strong at the core gap.

Figure 11:
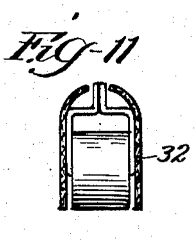
Figure 12:
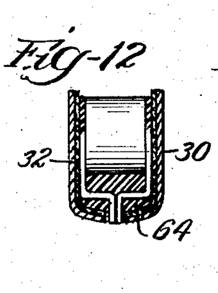
Figure 13:
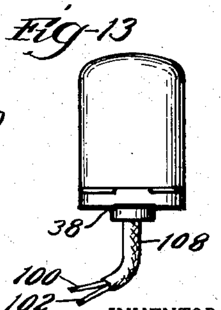

After forming the core gap, the coil and core assembly is placed within separator 32 as shown in Figure 11. These elements are then placed within shield 30 and the shield is filled with plastic 64 as seen in Figure 12. Figure 13 shows the completed head unit after the mounting plate 38 is arranged on the shield. The terminal wires 100 and 102 will usually be enclosed in a shield cable 108 to eliminate any stray pickup in the wires.

Figure 4:
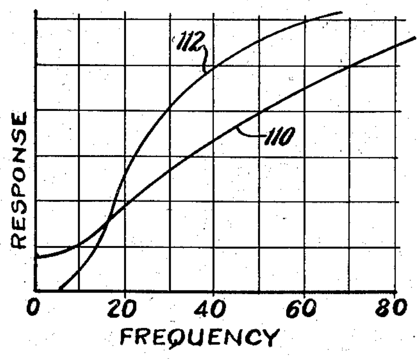
Figure 4 is a graph comparing the low end frequency response of my magnetic head with that of another magnetic head.

My magnetic heads have an exceptionally good low end response. That is, the lower frequencies, below 100 C. P. S., are not unduly attenuated. This is important since equalization in the amplifier is thereby simplified. In Figure 4, a response curve of a typical prior art head is shown at 110 and the response curve of one of my heads is shown at 112. It will be noted that my overall low frequency response is much higher. It is believed that the close coupling between the coil and core contributes to this.

Magnetic tape acts as an abrasive as it passes over the core and wears the core away. In prior art heads the wearing away of the core caused the gap to be opened. This, as previously mentioned, reduces the upper frequency limit. Thus, the heads have a much more limited useful life than my heads.

The magnetic tape rides within the channel 70 (Figures 1, 2 and 3) cut through the top of core 30 as well as over core 46. Thus a large surface is provided against which the tape is pressed. The tape will wear away the bottom of channel 70 and the ends of core 46 but at a much slower rate than if the tape wore against the core alone.

Even if the tape could wear the core at a high rate, there would be no appreciable high frequency fall-off due to opening of the gap. As seen in Figures 3, 6 and 10, the ends of legs 84 and 86 are adjacently disposed over a substantial distance. Hence, if the upper ends of the core are worn away even to a considerable extent, a uniform gap will remain.

The coil will have a resonant frequency due to the inductance of the windings and capacity between the turns. In tape recorders, a bias frequency in the neighborhood of from 20 to 100 kc. is applied to the record head to place the magnetic tape in a condition receptive to magnetization by the signal flux. It is desirable to have the resonant frequency of the coil correspond with the bias signal frequency. The resonant frequency of the coils in my magnetic heads may be varied by changing the type of windings (altering the capacity) without adverse effect on frequency response and other electrical characteristics of the head. Furthermore, the heads have a very broad resonance curve so the coil may be readily wound to be resonant at the bias frequency.

Figure 15:
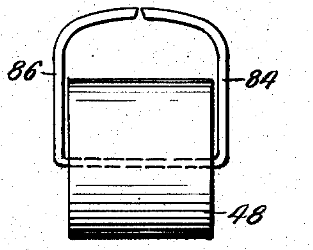

Figure 15 shows a modified form of the coil and core assembly. The core gap is provided between the ends of legs 84 and 86 and the gap is tapered. Instead of lapping or smoothing the internal faces of the legs, the ends and outside faces of the core are so treated. The ends of the core are ground off at an angle to a plane taken transversely of the longitudinal axis of the core. For example, an angle of 30 degrees may be used. The ends of the core may be ground while the core is in its unbent condition shown in Figure 7 or the core may be bent so that legs 84 and 86 are disposed at an angle of 30 degrees (assuming a 30-degree angle of cut) and a horizontal grind is taken across the ends. The legs 84 and 86 are shown in this position in dotted lines in Figure 8. The core may then be bent to the configuration shown in solid lines in Figure 8 for winding the coil. After annealing, the tapered ends are finish lapped and electroplated since they constitute the sides of the gap.

Particular care must be taken to make the upper sharp edge of the legs 84 and 86 as straight as possible since these edges are brought into abutting relation to form the gap. If the sharp edges are not reasonably straight lines, the fidelity of the recorded matter on a tape will suffer when another head assembly is used.

The method of producing the coil and core assemblies is essentially the same as previously discussed, except as above described, and also except that the core is bent in an arch shape to form the gap. It will be noted that legs 84 and 86 of Figure 15 have only a very gradual curve and have no sharp bends to lower the permeability of the core. The coil and core assembly shown in Figure 15 may be associated with the shield in the same manner as the coil and core assembly shown in Figure 14.

Figure 16:
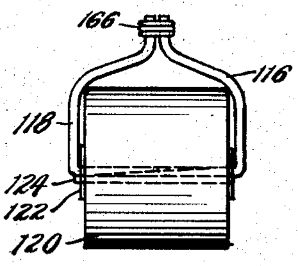
Figures 15, 16 and 17 are side sectional views of modified forms of the magnetic head.

Figure 16 shows a modified form of my magnetic head wherein the core is a two-piece structure and the coil is wound on a bobbin. A right-hand core piece 116 and left-hand core piece 118 are formed by suitable dies and correspond generally with the right-hand and left-hand halves of core 46, shown in Figure 14. Each core piece is provided with tapered faces on their bottom ends. All of the bends are made in the core pieces and the gap sides rough lapped before annealing. The gap sides are then finally lapped or honed and electroplated.

The coil 120 is wound upon a bobbin 122 to provide an axial chamber. The cores are terminated and otherwise treated in the manner described previously.

In assembling the coil and core assembly the lower ends of core pieces 116 and 118 are placed within bobbin 122 and the tapered faces forced into contact by wedges or a wedge such as indicated at 124. The upper end portions are then forced together and held together, for example, by wire 126 wrapped therearound.

Figure 17:
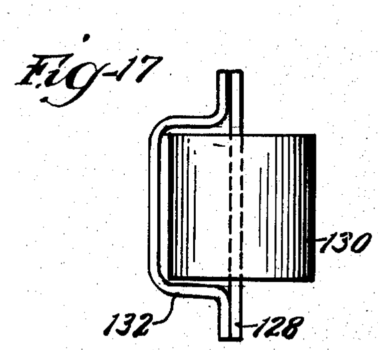

The core and coil assembly shown in Figure 16 requires a bobbin. Figure17 shows a two-piece core structure wherein a bobbin is not needed and the coil may be wound directly on the core. A straight core piece 128 has its upper end lapped to serve as a gap side and a coil 130 is wound thereon. Core piece 132 is formed in a U-shape before annealing and has its upper end lapped to serve as the other gap side. The lower ends of the core pieces are held together to provide core metal-to-core metal contact and the upper ends are forced and held together but separated by the electroplated, non-magnetic metal or a spacer such as aluminum foil. Wire, clamps or any other suitable means may be used to hold the core pieces together.

Figure 14:
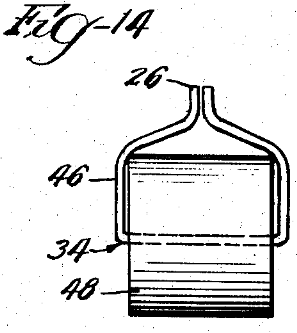
Figure 14 is a side elevational view of the coil and core assembly shown in Figure 3.
Figures 18, 19:
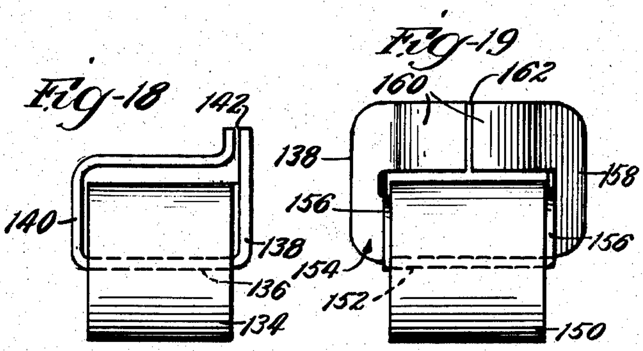
Figures 18 and 19 show other forms of magnetic heads particularly adapted for use in magnetic sound on film systems.

Figure 18 shows a coil and core assembly much the same as the assembly shown in Figure 14. However, the core gap is not centered relative to the coil but disposed above one end of the coil. This assembly is particularly adapted for use in systems combining magnetic and photoelectric sound on film.

The space available on existing motion picture projectors for the installation of magnetic heads is very limited and the large prior art heads are not readily adaptable to this use. With my small head units, existing projectors may be readily converted to only magnetic sound operation or provided with both magnetic and photoelectric sound operation. Furthermore, the use of my heads enables projectors having magnetic recording to be built without any material change over prior designs.

The coil and core assembly shown in Figure 18 has a coil 134 wound directly on the body portion 136. Straight leg portion 138 and bent leg portion 140 have their upper ends adjacently disposed to provide a core gap 142. The method of producing this coil and core assembly is essentially the same as described for the coil and core assembly of Figure 14.

Figure 20:
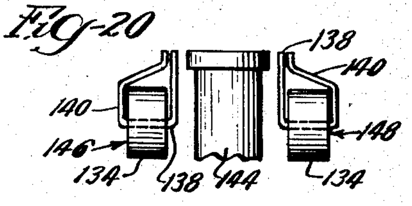
Figure 20 shows a pair of the assemblies shown in Figure 18 associated with the optic of a photoelectric pickup of a sound motion picture projector.

Figure 20 shows a pair of coil and core assemblies associated with the light scope 144 that provides the light to operate the photoelectric sound system of a motion picture projector. These coil and core assemblies are the same as those shown in Figure 18, one being an erase assembly, indicated at 146, and the other a combined record and playback assembly, indicated at 148. The shielding and mounting mechanisms for assemblies 146 and 148 are not shown but the drawing serves to illustrate how closely the photoelectric scope and magnetic heads may be arranged and how little space is required.

Figure 21:
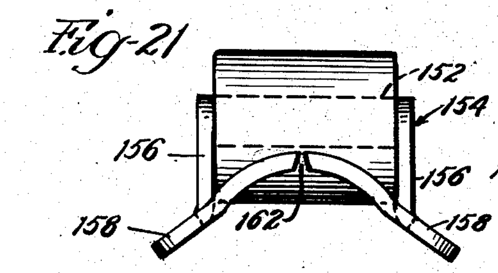
Figures 21 and 22 are front and side elevational views of the assembly shown in Figure 19.
Figure 22:
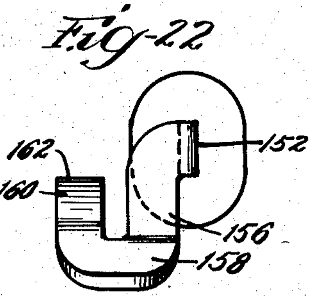

Figures 19, 21 and 22 show top plan, front elevation and side elevation views, respectively, of another magnetic head particularly adapted for motion picture projectors. A coil 150 is wound on a body portion 152 of the core 154. The remainder of the core is made up of vertical side portions 156, horizontal portions 158 and gap forming legs 160. The core gap is indicated at 162.

In this arrangement the coil is above and to one side of the core gap. This eliminates the necessity of providing space below the core gap and tape for the coil. In converting motion picture projectors to magnetic sound, the projector structure often precludes the availability of space below the tape-carrying film. Thus, my head unit is admirably suited for such conversion.

Having now described my invention, it should be evident that I have provided novel magnetic head units, coil and core assemblies, and means for shielding and mounting the assemblies as well as novel methods for producing the units and assemblies.

I claim:

1. An interchangeable mass-production electro-magnetic head structure for transducing signals by flux linkage between a multiple-turn coil and a relatively moving elongated magnetizable record, said head comprising a minute split core consisting of a cooperating pair of generally lengthwise extending mating sections of single-thickness strip-like magnetic material, the material of said sections being of uniform magnetic characteristics and said sections having optically smooth, flat confronting pole surface and butt surfaces adjacent opposite ends thereof and arranged with said butt surfaces in broad, flush, intimate core metal-to-core metal contact and defining an open-ended magnetic loop having a single, uniform, non-magnetic series gap therein, said sections having cooperating, outwardly facing record-engaging surfaces spaced apart by said gap, said gap having its loopwise direction generally parallel to the movement direction between said core and said record, with said confronting pole surfaces constituting gap walls the widthwise direction of which is generally normal to the plane of said loop, uniform-thickness spacing means of incompressible, non-magnetic material disposed between and in flush, intimate surface contact with said confronting pole surfaces to maintain a predetermined uniform spacing for said gap, a multiple-turn coil closely coupled around an intermediate strip portion of at least one of said core sections, and supporting structure interconnecting and fixing the spatial arrangement of the various parts of said head in assembled operative uniform relation.

2. The invention of claim 1 wherein said supporting structure comprises a solid encapsulation of insulating material intimately surrounding the various parts of said head with the exception of said record-engaging surfaces.

3. The invention of claim 1 wherein said spacing means is an electrodeposition film of uniform thickness on at least one of said confronting pole surfaces.

4. The invention of claim 1 wherein said coil has thousands of insulated turns.

5. The invention of claim 1 wherein one of said sections has generally coplanar pole and butt surfaces integrally connected by an intermediate strip portion offset in a direction generally normal to the plane of said last-mentioned pole and butt surfaces to extend in generally parallel spaced relation to said plane.

6. An interchangeable mass-production electromagnetic head structure for transducing signals by flux linkage between a multiple-turn coil and a relatively moving elongated magnetizable record, said head comprising a shield of paramagnetic material having an opening therein, a minute split core having a pair of generally lengthwise extending mating sections of single thickness strip-like magnetic material, the material of said sections being of uniform magnetic characteristics and said sections having optically smooth, flat confronting pole surfaces and butt surfaces adjacent opposite ends thereof and arranged with said butt surfaces in broad, flush, intimate, core metal-to-core metal contact to define an open-ended magnetic loop having a single uniform, non-magentic series gap therein, said sections having coopearting outwardly facing, record-engaging surfaces spaced apart by said gap, said gap having its loop-wise direction generally parallel to the direction of relative movement between said core and said record, with said confronting pole surfaces constituting gap walls, the direction of the major dimension of which is generally normal to the plane of said loop, non-magnetic spacer means disposed between and in flush, intimate contact with said confronting pole surfaces to maintain a predetermined uniform spacing for said gap, a multiple-turn coil closely coupled around an intermediate strip portion of at least one of said core sections, said core and coil being disposed in said shield with said gap adjacent said opening such that said record-engaging surfaces face outwardly through said opening, and supporting structure interconnecting and fixing the spatial arrangement of the aforesaid parts of said head in assembled, operative, uniform relation, said supporting structure comprising a solid encapsulation of insulating material for intimately surrounding said core and coil to provide exposure only of said record-engaging surfaces.

References Cited in the file of this patent

UNITED STATES PATENTS

| | | |
|---|---|---|
| 2,277,305 | Clopton | Mar. 24, 1942 |
| 2,428,002 | Barrett | Sept. 30, 1947 |
| 2,456,767 | Camras | Dec. 21, 1948 |
| 2,469,444 | Roys | May 10, 1949 |
| 2,493,742 | Begun | Jan. 10, 1950 |
| 2,513,617 | Begun | July 4, 1950 |
| 2,523,576 | Kornei | Sept. 26, 1950 |
| 2,530,584 | Pontius | Nov. 1, 1950 |
| 2,535,480 | Begun | Dec. 26, 1950 |
| 2,563,445 | Zenner | Aug. 7, 1951 |
| 2,574,898 | Behren | Nov. 13, 1951 |
| 2,585,932 | Hare | Feb. 19, 1952 |
| 2,591,070 | Howell | Apr. 1, 1952 |
| 2,595,791 | Hunt | May 6, 1952 |
| 2,612,681 | Camras | Oct. 7, 1952 |
| 2,644,856 | Pettus | July 7, 1953 |
| 2,650,952 | Bauer | Sept. 1, 1953 |
| 2,653,189 | Camras | Sept. 22, 1953 |
| 2,706,752 | Dupy | Apr. 19, 1955 |
| 2,725,430 | Gratian | Nov. 29, 1955 |

FOREIGN PATENTS

| | | |
|---|---|---|
| 661,428 | Great Britain | Nov. 21, 1951 |
| 679,117 | Great Britain | Sept. 10, 1952 |